United States Patent [19]

Goff

[11] 4,196,571
[45] Apr. 8, 1980

[54] FRUIT PICKING APPARATUS

[76] Inventor: Kenneth Goff, 620 Lorraine Cir., Lake Wales, Fla. 33853

[21] Appl. No.: 932,340

[22] Filed: Aug. 9, 1978

[51] Int. Cl.² ............................................ A01D 46/20
[52] U.S. Cl. ................................................ 56/328 R
[58] Field of Search ................. 56/328 R, 330; 193/7

[56] References Cited

U.S. PATENT DOCUMENTS

| | | | |
|---|---|---|---|
| 3,127,725 | 4/1964 | Richardson | 56/328 R |
| 3,413,786 | 12/1968 | Wehr | 56/328 R |
| 3,451,202 | 6/1969 | Murray | 56/328 R |
| 3,530,654 | 9/1970 | Staats, Sr. et al. | 56/328 R |
| 3,810,351 | 5/1974 | Austin | 56/328 R |
| 3,992,861 | 11/1976 | Edwards | 56/328 R |

Primary Examiner—Jay N. Eskovitz
Attorney, Agent, or Firm—Arthur W. Fisher, III

[57] ABSTRACT

A fruit picking apparatus for picking fruit from a tree configured for use in combination with a mobile chassis comprising a base rotatably mounted on the mobile chassis, a first boom assembly pivotally coupled to the base, a second boom assembly movably coupled to the first boom assembly and a picker assembly attached to the outer portion of the second boom assembly wherein the first boom assembly includes a first positioning device to pivot the first boom assembly relative to the base and a second positioning device to move the second boom assembly longitudinally relative to the first boom assembly and wherein the second boom assembly includes a first positioning device to pivot the second boom assembly relative to the first boom assembly and a second positioning device to pivotally adjust the picker assembly relative to the second boom assembly.

10 Claims, 6 Drawing Figures

FRUIT PICKING APPARATUS

BACKGROUND OF THE INVENTION

1. Field of the Invention

A fruit picking apparatus for picking fruit from a tree configured for use in combination with a mobile chassis.

2. Description of the Prior Art

A vast number of devices have been developed for picking or harvesting fruit from trees and the like.

One example comprises a vibratory fruit picking machine including a power driven means for shaking the tree or branches thereof to free the fruit. This vibratory type is generally undesirable because they may cause damage to the trees or fruit itself. Newer fruit picker machines include a picking head to be positioned adjacent the tree for direct contact with the fruit to separate the fruit from the tree. These may also cause damage as the fruit is removed from the branches during the picking operation.

Further many of these devices are relatively ineffective because they do not properly orient the tree branches in a manner which exposes the fruit for mechanical picking or provide a satisfactory manner of freeing the fruit from its stem. As a result such fruit picking devices may either leave the fruit on the tree or damage the fruit as it is removed. Moreover many such devices actually damage the trees themselves.

Typical of these devices are disclosed in U.S. Pat. Nos. 3,656,287; 3,690,053; 3,768,239; 3,744,226; 3,889,454; 3,968,631; 3,987,608; 4,000,601.

SUMMARY OF THE INVENTION

The present invention relates to a positioning apparatus specifically configured to operatively support and position various working attachments such as fruit picking elements, rotary discs, or buckets. More particularly, the positioning apparatus comprises a fruit picking apparatus for picking fruit from a tree configured for use in combination with a mobile chassis such as a truck or tractor. The fruit picking apparatus comprises a base, first and second boom assembly, and picker assembly.

The base comprises a yolk and a base drive means coupled to the yolk. The entire base is pivotally mounted on the mobile chassis by pivot shaft attached to the yolk.

The first boom assembly comprises a frame together with a first and second positioner. The entire frame is pivotally coupled to the base.

The first positioner comprises a hydraulic device movable between a first and second position coupled to the frame by a mounting means to pivot the first boom assembly in the vertical plane relative to the base. The second positioner comprises a positioner motor attached to the frame. The positioner motor is operatively coupled to a pair of parallel drive chains. A mounting slide coupled to the drive chain is attached to the second boom assembly. The positioner motor is operable in either direction to move the second boom assembly longitudinally along the longitudinal axis of the first boom assembly.

The second boom assembly comprises a frame together with a first and second positioner. The entire frame is pivotally coupled to the mounting slide by means of mounting brackets. The first positioner is coupled pivotally to the mounting slide by the pair of substantially parallel mounting brackets frame by substantially parallel mounting brackets. The second positioner is coupled between a pair of lower substantially parallel mounting brackets affixed to the frame and the picker assembly having mounting brackets attached thereto. The first and second positioners each comprise a hydraulic device movable between a first and second position similar to that previously described as the first positioner of the first boom assembly. The first positioner extends or pivots the second boom member in the vertical plane relative to the first boom member while the second positioner movable between the first and second position moves or pivots the picker assembly in the vertical plane relative to the lower portion of the second boom assembly.

The picker assembly comprises a frame. A drive means is operatively coupled to a pair of drive chains each having a picker element attached thereto. Each picker element comprises an elongated base member having a center member extending outwardly from the mid-portion thereof and substantially perpendicular thereto and a pair of substantially U-shaped end members disposed at opposite ends thereof. Attached to the end members is a pair of guide elements forming a receiving chamber.

In operation, the operator moves the portable or mobile chassis through the grove to the picking location. In view of the essentially vertical configuration, the fruit picking apparatus can be moved freely through the grove or orchard. When essentially in position the base drive means is actuated to rotate the entire fruit picking apparatus in horizontal plane. The first positioner of the first boom assembly is in actuated to lower the first boom assembly in the vertical plane toward the tree to be picked. Then the second positioner is the operatively moved by the positioner motor to move the second boom assembly longitudinally along the first boom assembly to adjust the vertical height of the picker assembly. Then the first and second positioners of the second boom assembly are actuated to rotate the second boom assembly outwardly relative to the first boom assembly and move the fruit picking assembly into operative positon relative to the tree itself. The picker assembly dirve means is then actuated causing the picking elements to travel about the frame. During the picking operation, the fruit enters into the guide element through the channel formed between the center member and the guide element and forced into the receiving chamber the picker element where it is trapped and picked from the tree.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
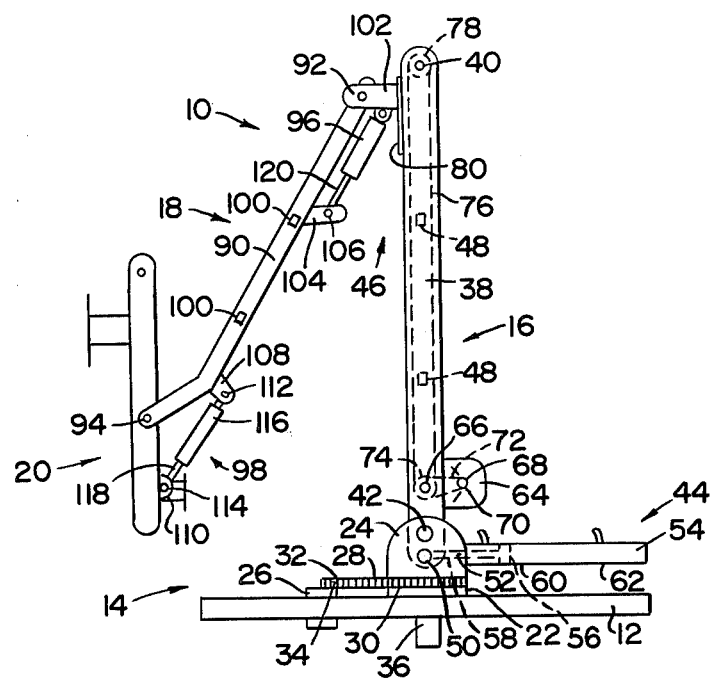
FIG. 1 is a side view of a fruit picking apparatus.
Figures 2, 3:
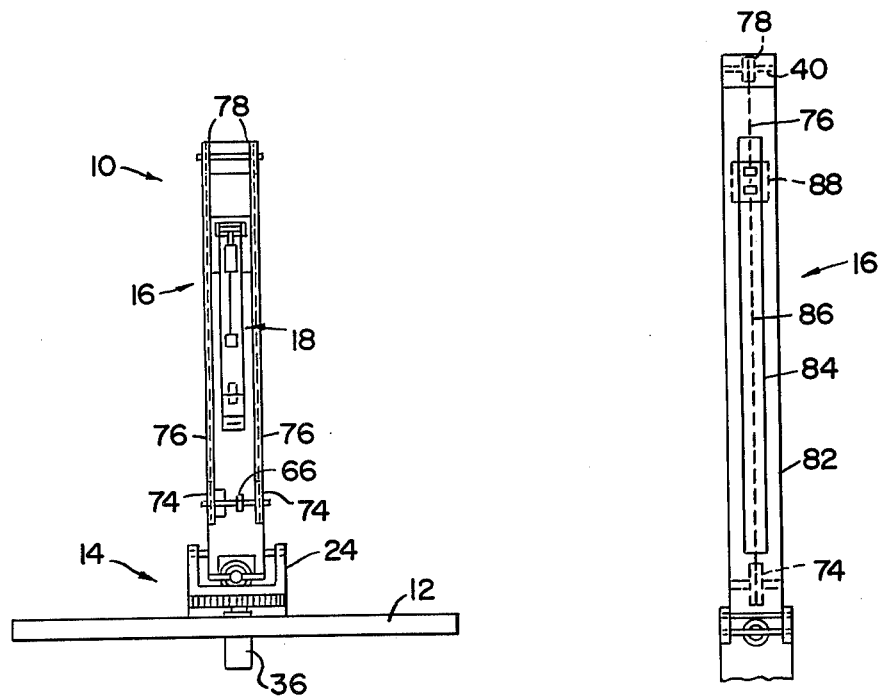
FIG. 2 is a partial front view of the fruit picking apparatus.
FIG. 3 is a partial front view of an alternate embodiment of the fruit picking apparatus.

As shown in FIGS. 1 and 2, the present invention relates to a positioning apparatus generally indicated as 10, specifically configured to operatively support and position various working attachments such as fruit picking elements, rotary discs, or buckets. More particularly, as shown in FIGS. 1 and 2, the present invention relates to a fruit picking apparatus 10 for picking fruit from a tree configured for use in combination with a mobile chassis partially shown as 12. The fruit picking apparatus 10 comprises a base, first and second boom assembly, and picker assembly generally indicated as 14, 16, 18 and 20 respectively.

As best shown in FIGS. 1 and 2, the base 14 comprises a yolk including a substantially circular base plate 22 having a pair of substantially parallel side plates 24 extending upwardly therefrom and a base drive means including a base drive motor 26 coupled to the yolk by a chain 28 extending between a plurality of teeth 30 formed on the substantially circular base plate 22 and sprocket 32 attached to the output shaft 34 of the base drive motor 26. The entire base 14 is pivotally mounted on the mobile chassis 12 by pivot shaft 36 attached to the yolk itself. Of course, the base drive motor 26 may be coupled directly to the pivot shaft 36.

The first boom assembly 16 comprises a frame including a pair of side frame members 38 held in fixed spaced relationship relative to each other by upper and lower frame members or axles 40 and 42 respectively together with a first and second positioner generally indicated as 44 and 46 respectively. In addition, one or more cross bars or members 48 may extend between the side frame members 38 to provide additional support. The entire frame is pivotally coupled to the base 14 on lower frame member or axle 42 extending between and through side plates 24.

The first positioner 44 comprises a hydraulic device movable between a first and second position coupled to side frame members 38 and side plates 24 by a mounting means or axles 50 and 52 respectively to pivot the first boom assembly 16 in the vertical plane relative to the base 14 as described more fully hereinafter. The hydraulic device comprises a hollow cylinder 54 having a piston 56 disposed therein wherein the piston 56 is coupled to the mounting means or axle 50 through coupling means or linkage 58. The hollow hydraulic cylinder 54 is coupled to a hydraulic reservoir and pump means of conventional configuration (not shown) by means of first and second conduits 60 and 62 respectively to selectively move the piston 56 and first positioner 44 between the first and second postion as previously described.

The second positioner 46 comprises a second positioner motor 64 attached to the side frame members 38. The second positioner drive motor 64 is operatively coupled to drive axle 66 by drive sprocket 68 coupled to the output shaft 70 of the second positioner motor 64 by a chain 72. Operatively mounted on opposite of the drive axle 66 is a pair of drive sprockets 74 disposed in operative engagement with a pair of substantially parallel drive chains 76 which are similarily coupled to a pair of idlers sprockets 78 disposed at the upper end of the frame by means of upper frame member or axle 40. As best shown in FIG. 1, fixedly attached to the parallel drive chains 76 is a mounting slide 80 to which the second boom assembly 18 is attached. As described more fully hereinafter, the second positioner motor 64 is operable in either direction to move the second boom assembly 18 longitudinally along the longitudinal axis of the first boom assembly 16.

An alternate embodiment of the first boom assembly 16 is shown in FIG. 3. Specifically the frame comprises a substantially square metal tube or elongated outer enclosure (member) 82 have an elongated aperture 84 formed on one side thereof. Attached at opposite sides of the elongated aperture 84 is a pair of flexible guard elements 86 disposed to substantially close the elongated aperture 84 to prevent fruit, branches and the like from being caught within the elongated enclosure 82. The mounting slide 80 comprises a substantially square metal tube or inner enclosure (member) 88 disposed within the larger elongated enclosure 82. By vitue of the additional strength and sliding relationship between the inner and outer enclosures or members 82 and 88, the mounting slide 80 is attached to single drive chain 76. However, the remaining elements are substantially identical and are similarily numbered as reflected in FIGS. 1 and 2.

As shown in FIGS. 1 and 2, the second boom assembly 18 comprises a frame including a pair of side frame members 90 held in fixed spaced relationship relative to each other by upper and lower frame members or axles 92 and 94 respectively together with a first and second positioner generally indicated as 96 and 98 respectively. In addition one or more cross bars or members 100 may extend between side frame members 90 to provide additional support. The entire frame is pivotally coupled to the mounting slide 80 on upper frame member 92 by means of mounting brackets 102. The first positioner 96 is coupled pivotally to the mounting slide 80 by the pair of substantially parallel mounting brackets 102 and side frame members 90 by substantially parallel mounting brackets 104 by pin or axle 106. The second positioner is coupled between a pair of lower substantially parallel mounting brackets 108 affixed to the side frame members 90 and the picker assembly 20 having mounting brackets 110 attached thereto by pins or axles 112 and 114 respectively. The first and second positioners 96 and 98 respectively each comprise a hydraulic device movable between a first and second position similar to that previously described as the first positioner 44 of the first boom assembly 16. Specifically each hydraulic device comprises a hollow cylinder 116 having a piston 118 disposed therein wherein the piston 118 is coupled to mounting brackets 104 and 110 respectively through coupling means or linkage 120. The hollow hydraulic cylinder 116 is coupled to a hydraulic reservoir and pump means of conventional configuration (not shown) by means of first and second conduits 122 and 114 respectively to selectively move the piston 118 and the positioners 96 and 98 between the first and second position as more fully described hereinafter. The first positioner 96 extends or pivots the second boom member 18 in the vertical plane relative to the first boom member 16 through axle 92 while the second positioner 98 movable between the first and second position moves or pivots the picker assembly 20 in the vertical plane relative to the lower portion of the second boom assembly 20 through pivot point or axle 94.

Figure 4:
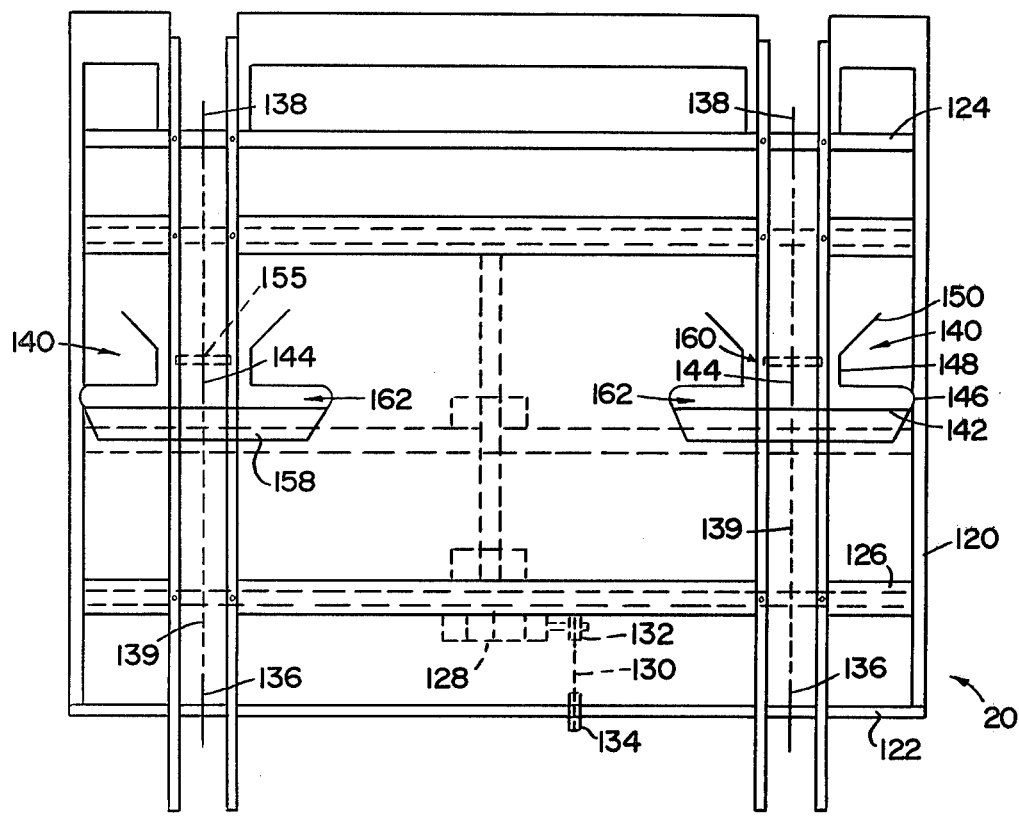
FIG. 4 is a detailed top view of the picker assembly.
Figure 5:
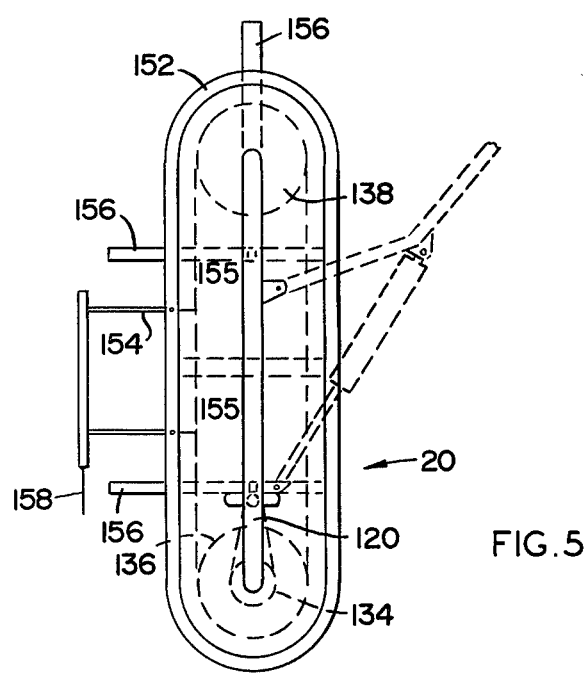
FIG. 5 is a detailed side view of the picker assembly.
Figure 6:
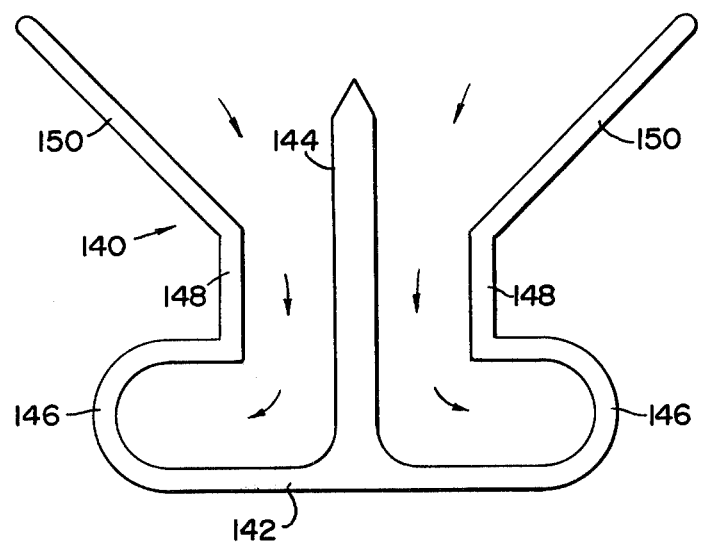

As best shown in FIGS. 4 and 5, the picker assembly 20 comprises a frame including a pair of substantially parallel side frame members 120 held in fixed spaced relation relative to each other by first and second frame members or axles 122 and 124 respectively. Of course, other operating heads or assemblies such as water spray may be attached to the second boom assembly. In addition one or more cross bars or members 126 may extend between the side frame members 120 to provide additional support. As shown a drive means comprising a picker assembly drive motor 128, attached to cross member 126, is operatively coupled to the drive axle or first frame member 122 through a drive chain 130 interconnecting first and second sprockets 132 and 134. Operatively mounted at the opposite ends of the drive axle or first frame member 122 is a pair drive sprockets 136. Mounted at opposite ends of the second frame member or idler axle is a pair of idler sprockets 138. Extending between the drive sprockets and idler sprockets 136 and 138 is a pair of drive chains 139 having a picker element generally indicated as 140 attached thereto. As best shown in FIG. 4, each picker element 140 comprises an elongated base member 142 having a center member 144 extending outwardly from the mid-portion thereof and substantially perpendicular thereto and a pair of substantially U-shaped end members 146 disposed at opposite ends thereof. Attached to the end member 146 is a pair of guide elements including a first guide member 148 substantially parallel to the center member 144 and a second guide member 150 angularly inclined outwardly from the end portion of the first guide member 148. Each picker element 140 is operatively coupled to a pair of substantially parallel rails 152 by interconnecting member 154 comprising a substantially inverted T-shaped element. Coupling member 155 is attached between the lower portion of the T-shaped element 154 and drive chains 139. The picker assembly 20 further includes a scraper means comprising a plurality of first scraper elements 156 attached between the side frame members 120 and parallel rails 152 together with a second scraper element 158 attached to the rear portion of each picker element 140.

In operation, the operator moves the portable or mobile chassis through the grove to the picking location. In view of the essentially vertical configuration, the fruit picking apparatus 10 can be moved freely through the grove or orchard. When essentially in position the base drive motor 26 is actuated to rotate the entire fruit picking apparatus 10 in horizontal plane. The first positioner 44 of the first boom assembly 14 is in actuated to lower the first boom assembly 16 in the vertical plane toward the tree to be picked. Then the second positioner 46 is the operatively moved by the second position motor 64 to move the second boom assembly 18 longitudinally along the first boom assembly 14 to adjust the vertical height of the picker assembly 20. Then the first and second positioners 96 and 98 of the second boom assembly 18 are actuated to rotate the second boom assembly 18 outwardly relative to the first boom assembly 16 and move the fruit picking assembly 20 into operative position relative to the tree itself. The picker assembly drive motor 128 is then actuated causing the picking elements 140 to travel about the frame as shown in FIG. 1. During the picking operation, the fruit enters into the guide element through channel 160 formed between the center member 144 and the first guide member 148, and forced into the receiving chamber 162 of the picker element 140 where it is trapped and picked from the tree.

Since each of the three hollow hydraulic cylinders 54, 96 and 116 are pivotally mounted, each hydraulic device pivots to follow the travel of the corresponding piston 54,120 and 118 respectively. Further the rail 152 and interconnecting elements 154 permit the picker elements 140 to freely follow the contour of the frame. Any fruit trapped in the receiving chamber 162 is wiped or scraped therefrom by first scraper elements 156.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A fruit picking apparatus for picking fruit from a tree configured for use in combination with a mobile chassis comprising a base rotatably mounted on the mobile chassis, at least one boom assembly pivotally coupled to said base and a picker assembly movably coupled to said boom assembly, said picker assembly comprises a frame attached to said boom assembly, a drive means operatively mounted on said frame and at least one picker element configured to engage the fruit to be picked operatively mounted on said drive means, said picker element comprises an elongated base member having a center member extending outwardly therefrom and a substantially U-shaped member formed therein in combination with at least one guide element formed on said substantially U-shaped end member of said elongated base member, said guide element comprising a first guide member extending outwardly from the end of said elongated base member and substantially parallel to said center member and a second guide member extending angularly outwardly from the end portion of said first guide member, said first guide member and said center member cooperatively form a channel therebetween to engage and guide the fruit to a receiving chamber formed by said substantially U-shaped end member where the fruit is lodged and twisted from the stem.

2. The fruit picking apparatus of claim 1 wherein said boom assembly comprises a first boom assembly pivotally coupled to said base and a second boom assembly movably coupled to said first boom assembly, said picker assembly movably coupled to the outer portion of said second boom assembly wherein said first boom assembly includes a first positioner to pivot said first boom assembly relative to said base and a second positioner coupled to said second boom assembly to move said second boom assembly longitudinally relative to said first boom assembly and wherein said second boom assembly includes a first positioner to pivot said second boom assembly relative to said first boom assembly and a second positioner to pivotally adjust said picker assembly relative to said second boom assembly.

3. The fruit picking apparatus of claim 2 wherein said first positioner of said first boom assembly comprises a hydraulic device including a hollow cylinder having a piston disposed therein, said piston movable between a first and second position, said hollow cylinder being pivotally mounted on said base and said piston coupled to the lower portion of said first boom assembly to selectively move said first boom assembly in the vertical plane relative to said base when said piston is moved between said first and second position.

4. The fruit picking apparatus of claim 2 wherein said second positioner of said first boom assembly comprises a second positioner motor attached to said first boom assembly, said second positioner motor being operatively coupled to a mounting slide by at least one drive chain, said second boom assembly being coupled to said mounting slide to move said second boom assembly longitudinally relative to said first boom assembly.

5. The fruit picking apparatus of claim 4 wherein said second boom assembly comprises a frame coupled to said mounting slide of said first boom assembly.

6. The fruit picking apparatus of claim 5 wherein said first positioner of said second boom assembly comprises a hydraulic device including a hollow cylinder having a piston disposed therein, said piston movable between a first and second position, said piston being pivotally coupled to said second boom assembly to selectively move said second boom assembly in the vertical plane relative to first boom assembly when said piston is moved between said first and second position and said second positioner of said second boom assembly comprises a hydraulic device including a hollow cylinder having a piston disposed therein, said piston movable between a first and second position, said piston being pivotally coupled to said picker assembly to selectively move said picker assembly in the vertical plane relative to said second boom assembly when said piston is moved between said first and second position.

7. The fruit picking apparatus of claim 2 wherein said first boom assembly comprises an elongated outer member having an elongated aperture formed on one side thereof and an inner member disposed within said elongated outer member, said inner member being operatively coupled to said second positioner of said first boom assembly to move said second boom assembly longitudinally relative to said first boom assembly.

8. The fruit picking apparatus of claim 7 wherein said first boom assembly further includes a pair of flexible guard elements disposed on opposite sides of said aperture to substantially close said elongated aperture to prevent fruit, branches and the like from being caught within said elongated outer member.

9. The fruit picking apparatus of claim 1 wherein said drive means comprises a picker assembly drive motor operatively mounted on said frame and a drive chain interconnecting sprockets attached to opposite ends of said frame.

10. The fruit picking apparatus of claim 1 wherein said picker assembly further includes a first scraper element attached to said frame to scrape fruit caught in said receiving chamber.

* * * * *